May 24, 1932. T. A. PEEBLES Re. 18,479
COMBUSTION CONTROL
Original Filed June 13, 1929
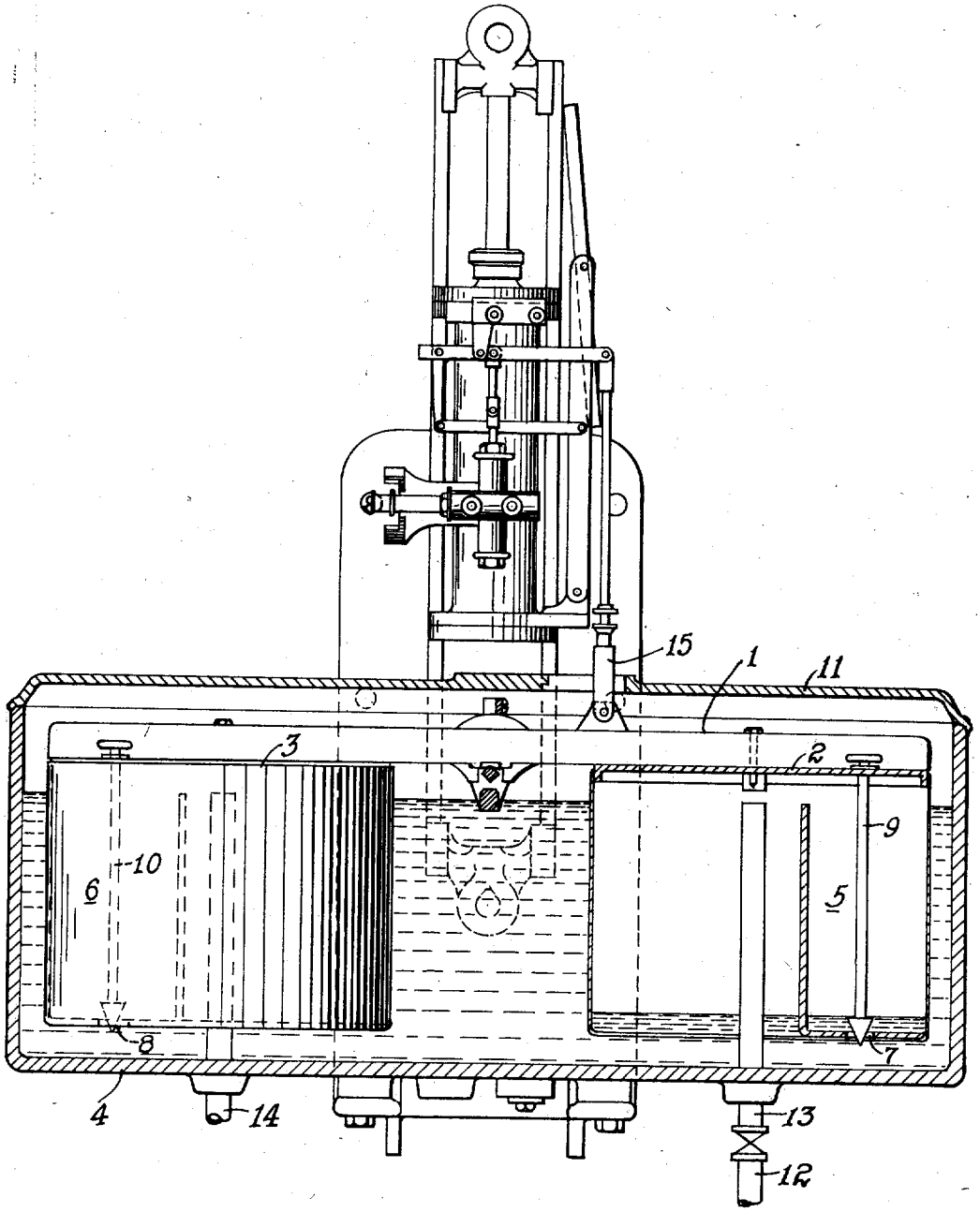
INVENTOR
Thomas A. Peebles
By Green & McCallister
His Attorneys Reissued May 24, 1932

Re. 18,479

UNITED STATES PATENT OFFICE

THOMAS A. PEEBLES, OF MOUNT LEBANON, PENNSYLVANIA, ASSIGNOR TO JOHN M. HOPWOOD, OF DORMONT, PENNSYLVANIA

COMBUSTION CONTROL

Original No. 1,800,400, dated April 14, 1931, Serial No. 370,525, filed June 13, 1929. Application for reissue filed September 24, 1931. Serial No. 564,925.

This invention relates to improvements in regulating devices such, for example, as pressure operated regulators commonly employed in connection with boiler furnaces or the like.

One well known form of such regulator includes as a part of the operating mechanism a balanced lever having an inverted bell secured to each end thereof, the lower open mouths of the bells being located below the surface of a sealing liquid contained in an associated tank. Pressure taps connect the interior of one or both bells with the associated apparatus which is subject to the pressure variations by and in accordance with which the regulator is actuated. It has been found in practice that, as a result of this arrangement, any sudden or relatively large change in pressure which is transmitted directly to one of the bells causes the lever to be shifted beyond the point which it would normally assume as a result of such pressure change, with the result that the lever is momentarily oscillated back and forth until the position of equilibrium is attained. It will be apparent that this so called "hunting" of the regulator is a very objectionable feature, and an object of this invention is to provide a regulator of the type set forth constructed and arranged so as to obviate this defect.

Another object of this invention is to produce a pressure responsive mechanism which can be regulated and adapted to use on any type of furnace regardless of the degree of pressure variations encountered.

These and other objects which will be apparent to those skilled in the art are accomplished by means of the invention illustrated in the accompanying drawing in which the figure is a transverse sectional view of a well known type of regulator constructed in accordance with one embodiment of this invention.

The particular form of the invention which has been chosen for illustration is shown in connection with a regulator of the type described and claimed in Letters Patent No. 1,338,923, dated May 4, 1920, to J. M. Hopwood, having a balanced lever 1 provided at each end with inverted bells 2 and 3 immersed to a suitable extent in a fluid contained in a tank 4, having a movable cover 11. A pressure tap 12 projects into one of the inverted bells, as 2, and the other bell 3 is in the illustrated embodiment connected with the atmosphere by tap 14. As the lower ends of the bells are sealed by the fluid any changes of pressure will cause corresponding shifting of the lever 1. An arm 15 secured to lever 1 connects the lever with the vertically movable frame which is connected to the associated apparatus in the usual manner. Any sudden or relatively large change in pressure transmitted to the bell 2 causes the lever 1 to be shifted beyond the point which it would normally assume as a result of such pressure change, thereby causing the lever to momentarily oscillate back and forth.

The present invention provides an arrangement for eliminating this so-called "hunting" of the regulator by the addition of certain mechanism to the bells which includes partially closed chambers 5 and 6 which partially close the openings of the bells. The chambers 5 and 6 have orifices 7 and 8 to permit the fluid in the tank to flow into said chambers and threaded needle valves 9 and 10 fitting into the orifices to regulate the rapidity with which the fluid may pass therethrough. Any pressure change in the bell, through the pressure tap, will cause one bell to be raised and the other to be lowered. The bell being raised is retarded in its upward movement until the fluid in the chamber has passed out through the orifice. By regulating the needle valve in the orifice the degree of retarding influence of the chamber can be controlled. The other bell acts as a dash pot or drag until the fluid in the chamber has attained the level of the fluid in the tank. Thus by regulating the size of the orifice with the needle valve the time it acts as a drag can be controlled. The orifices can be restricted by the needle valves to any desired extent so that sudden movement of the lever will be eliminated, regardless of variation in pressure changes. It is readily seen that an even movement of the lever can be secured whether the pressure changes are rapid and sharply defined or slow and uniform.

In the operation of the regulator, the lever 1 is in equilibrium and the internal pressure in the bell 2 is equal to the pressure in the line 12. The bell 3 has internal pressure equal to the atmosphere. If the pressure in the line 12 is increased, the bell 2 will move upwardly and since the lever is in equilibrium there is no resistance to the initial upward movement. However, as the upward movement continues, the liquid in the chamber 5 is raised imposing an increasing resistance to further upward movement. When the level of the liquid in the chamber 5 rises above the level of the liquid in the tank 4, the liquid tends to flow out of the orifice 7 thereby decreasing the resistance to further upward movement in accordance with the time elapsed since the movement started. As the bell 2 is raised, the bell 3 on the opposite end of the lever 1 is forced downwardly into the liquid in the tank 4 and further resists the moving of the lever 1 out of equilibrium. As the bell 3 is lowered, the level of the liquid in chamber 6 goes below the level of the liquid in the tank 4. The liquid in the tank tends to flow into the chamber 6 through the orifice 8 and decreases the resistance to further movement of the lever 1 as the liquid in the chamber approaches the level of the liquid in the tank and the lever 1 is again in equilibrium. By making the orifices 7 and 8 in the bell chambers the same size the amount of resistance to further movement of the lever can be controlled as can the time in which the liquid in the chambers acts as retarding factors to the movement thereof.

Having now described my invention what I claim as new and desire to secure by Letters Patent is:

1. The combination in a pressure responsive mechanism, having a fluid tank and a balanced lever provided with inverted bells extending into the fluid in said tank, of means for resisting movement of said lever including fluid chambers partially closing the ends of said bells, and restricted orifices in said chambers for retarding the ingress and egress of fluid into and out of said bells, whereby the resistance to movement of said lever is increased with the extent of movement and decreased in accordance with the time elapsed since the movement started.

2. The combination in a pressure responsive mechanism, of a fluid tank, a balanced lever provided with inverted bells extending into the fluid in said tank, a fluid chamber partially closing the end of each of said bells, an orifice in each of said chambers for permitting the liquid in said tank to flow into and out of the chambers, and a valve for restricting said orifices.

3. The combination in a pressure responsive mechanism, having a fluid tank and a balanced lever provided with inverted bells extending into the fluid of said tank, means for resisting the movement of said lever out of equilibrium including fluid receiving chambers partially closing the ends of said bells having restricted orifices therein for permitting the liquid in said tank to flow into and out of said chambers so that the resistance to movement of said lever increases in accordance with the extent of movement and decreases as the time since the movement started increases.

4. A pressure responsive regulating apparatus comprising a fluid tank, a balanced lever having inverted bells extending into the fluid in said tank, pressure pipes leading to said bells and means for resisting movement of said lever out of equilibrium, said means including fluid chambers partially closing the opening of said bells and restricted orifices in said chambers for permitting communication between said tank and said chambers so that on variation of the pressure in one of said bells the fluid in one chamber acts as a weight resisting movement and the fluid in the other bell acts as a drag to resist said movement.

5. A pressure responsive regulating apparatus comprising in combination a fluid tank, a balanced lever having inverted bells extending into the fluid of said tank, means for introducing a variable pressure to one of said bells, fluid chambers partially closing the mouth of each of said bells having openings communicating with said tank and means associated with said chambers for reestablishing the equilibrium of said lever after a pressure variation in one of said bells.

6. A pressure responsive regulating apparatus comprising in combination a fluid tank, a balanced lever having inverted bells extending into the fluid of said tank, fluid chambers partially closing the opening of said bells, said chambers having restricted orifices therein communicating with said tank, means for introducing a variable pressure to one of said bells and means for restricting the flow of liquid into and out of said fluid chambers for reestablishing the equilibrium of said lever after a pressure variation in one of said bells.

7. A pressure responsive regulating apparatus comprising in combination a fluid tank, a lever having inverted bells extending into the fluid of said tank, said lever being in equilibrium with one of said bells, means for introducing a variable pressure to one of said bells, fluid chambers partially closing the mouth of each of said bells having openings therein communicating with said tank and means associated with said chambers for reestablishing the equilibrium of said lever after a pressure variation in one of said bells.

8. A pressure responsive regulating apparatus comprising in combination a fluid tank, a lever having inverted bells extending into the fluid of said tank, said lever being in equilibrium with one of said bells, fluid chambers partially closing the openings of said bells, said chambers having restricted orifices therein communicating with said tank and means for introducing a variable pressure to one of said bells and means for restricting the flow of liquid into and out of said fluid chambers for reestablishing the equilibrium of said lever after a pressure variation in one of said bells.

9. In a pressure responsive regulating apparatus, in combination, a tank having liquid therein, a lever having an inverted bell extending into the liquid in said tank, means acting on said lever to place said lever and bell in equilibrium, means for introducing a variable pressure to said bell, a chamber partially closing the mouth of said bell and having an opening therein communicating with said tank, and means for regulating the size of said opening.

10. In a pressure responsive regulating apparatus, in combination, a tank having liquid therein, a lever having an inverted bell connected to said lever near one end thereof and partially submerged in the liquid in said tank, a chamber partially closing the mouth of said bell and having an opening therein to put the liquid in said tank and chamber in communication, a valve mounted in said bell and operatively controlling the opening in said chamber, and means acting on said lever to balance the forces exerted by the bell and chamber on said lever.

11. In a pressure responsive regulating apparatus, in combination, a tank having liquid therein, a lever having a fulcrum between the ends thereof, an inverted bell connected to said lever near one end thereof and partially submerged in the fluid in said tank, a chamber partially closing the mouth of said bell and having an opening therein to put the liquid in the tank in communication with the interior of said chamber, a valve in said bell and operatively controlling the chamber opening aforesaid, and means acting on the other end of said lever to place said lever, bell and chamber in balance.

In testimony whereof I have hereunto subscribed my name this 18th day of April, 1932.

THOMAS A. PEEBLES.